United States Patent
Bouclin

[15] 3,698,241
[45] Oct. 17, 1972

[54] VIBROACOUSTIC TEST METHOD
[72] Inventor: Peter Bouclin, China Lake, Calif.
[73] Assignee: The United States of America as represented by the Secretary of the Navy
[22] Filed: March 1, 1971
[21] Appl. No.: 119,979

[52] U.S. Cl. .................................73/69, 73/71.5
[51] Int. Cl. ........................G01h 1/00, B06b 1/00
[58] Field of Search..........73/71.5, 69, 67.3, 67, 432; 181/.5 NP, .5 R

[56] References Cited

UNITED STATES PATENTS
3,104,543  9/1963  Kaminski.......................73/69

OTHER PUBLICATIONS

An article, " A Spectrum Equalizer for Acoustic Noise Testing" by Boynton from MB Vibration Notebook February 1961 Vol. 7, No. 1 (73– 69)

Primary Examiner—James J. Gill
Attorney—R. S. Sciascia and Roy Miller

[57] ABSTRACT

Vibroacoustical method for vibration qualification of weapon systems to determine structural integrity, which comprises exposing externally carried aircraft store to a controlled acoustic environment which develops the operational vibration environment.

1 Claim, 2 Drawing Figures

PATENTED OCT 17 1972 3,698,241

INVENTOR.
PETER BOUCLIN
BY: ROY MILLER
ATTORNEY.

VIBROACOUSTIC TEST METHOD

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The structures and equipment components in high performance missiles, aircraft, aircraft stores and the like are at times subjected to severe vibroacoustical environments which subject the parts and/or equipment components to vibration stresses seriously affecting the reliability of the structure and/or equipment. Accordingly, such devices must be pretested by suitable vibration tests in order to insure maximum reliability under service conditions.

Currently, the electrodynamic vibration test procedure is the method employed to qualify production and preproduction weapon systems and to determine the structural integrity of prototype design. Such testing is performed with input vibration levels based on predicted and measured captive flight vibratory response of weapon systems. This method results in unsatisfactory reproduction of the captive flight environment. The primary reason is that the source of vibration of externally carried weapon systems on high performance jet aircraft is not aircraft induced, but rather aerodynamically/aeroacoustic in nature. The limitations of electrodynamic shakers, inherent design, is a vibration frequency of five to 2,000 Hz. Vibration response of the weapon system to captive flight reveals major frequency responses well beyond 5,000 Hz. The vibroacoustic method described herein is capable of developing vibration acceleration levels out to 20,000 Hz.

SUMMARY OF THE INVENTION

The present invention is a method for determining the structural integrity of an externally carried aircraft store. This is done by exposing the store to acoustic energy to develop the operational vibration environment. An aircraft store with an accelerometer attached thereto is placed in an acoustic chamber and subjected to vibroacoustical environment. The acoustic chamber environment is adjusted until the responses of the accelerometer attached to the store essentially match the inflight accelerometer responses of the store.

In testing with electrodynamic shakers, there is an upper frequency limit of 2,000 Hz. The method of the present invention allows major frequency responses well beyond 5,000 Hz.

DETAILED DESCRIPTION OF THE INVENTION

Figure 1:
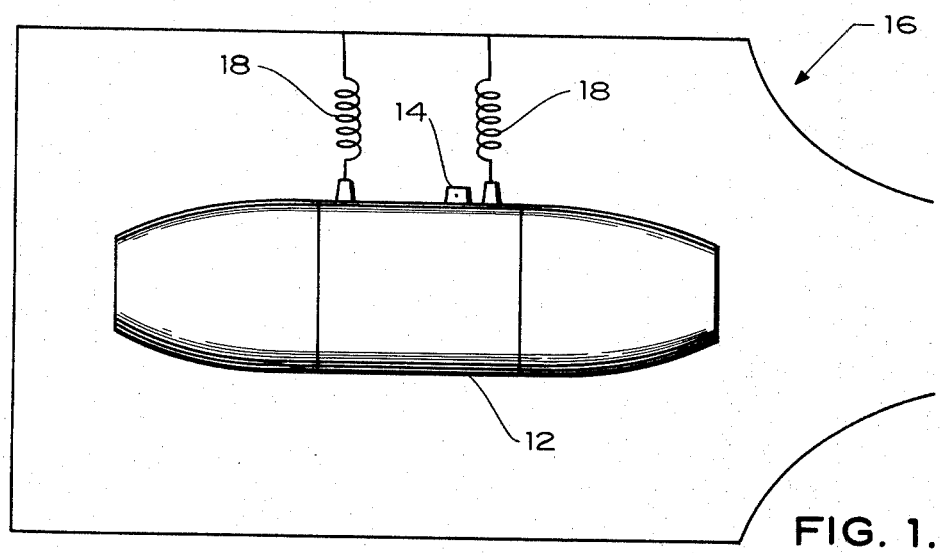
FIG. 1 shows the virbroacoustic test setup.
Figure 2:
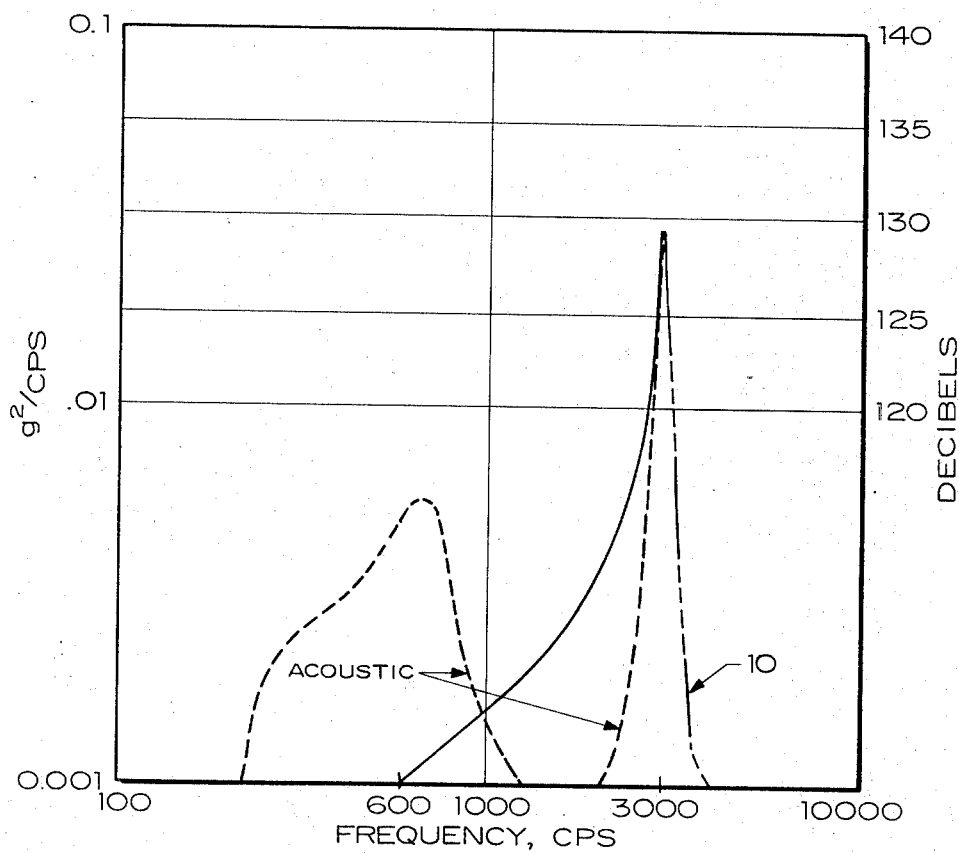
FIG. 2 shows a comparison of captive flight response with the response to vibroacoustic excitation.

Initially the captive flight responses of an aircraft store must be determined. This is done by attaching an accelerometer to the store and recording the inflight vibroacoustic excitation response. From the data of this test, a graph is made relating the force on the the store as recorded by the accelerometer with various operating frequencies. This relationship is shown on the graph of FIG. 2 as a dotted line 10.

The store 12 with attached accelerometer 14 is then removed from the aircraft, and placed within a commercially available acoustic chamber 16. The store is softly suspended in the acoustic chamber by springs 18. No wall of the chamber is parallel to any other wall of the chamber so as to prevent the chamber from becoming resonant. Therefore, all the energy of the sound source may be directed to the store under test.

Acoustic energy at a given frequency is then fed to the chamber. The sound level at the given frequency is then adjusted until the accelerometer response matches the inflight response. Because of the operating characteristics of the chamber used to obtain the data graphed in FIG. 2, the acoustic levels in the lower frequency range were allowed to produce excessive vibrations in that range so that the most severe operational levels which occurred near 3,000 Hz could be reproduced. In bigger acoustic chambers, the inflight responses could be more closely matched.

What is claimed is:

1. The method of subjecting an aircraft store to a simulated vibracoustic environment to determined structural integrity of the store comprising;

subjecting a surrogate store to an actual inflight vibrational environment;

recording the vibrational responses of the surrogate store;

placing a store to be tested in an acoustic chamber;

coupling acoustic energy at a given frequency to the chamber;

measuring the vibrational response of said store while the acoustic energy is coupled to said chamber and adjusting the acoustic level until the vibrational response equals that previously recorded when the surrogate store was subjected to an inflight environment.

* * * * *